Patented July 30, 1929.

1,722,928

UNITED STATES PATENT OFFICE.

LEON LILIENFELD, OF VIENNA, AUSTRIA.

ARTIFICIAL MATERIAL AND PROCESS FOR MAKING SAME.

No Drawing. Application filed March 17, 1925, Serial No. 16,257, and in Austria April 4, 1924. Renewed June 29, 1928.

The hitherto known compounds of cellulose which are soluble in alkalies possess many disadvantages in connection with their industrial application.

Viscose undergoes a steadily increasing spontaneous decomposition with the liberation of carbon disulphide. This reaction has to be watched carefully and interrupted at the correct time, since the viscose is not suitable for its most important applications (for instance, spinning artificial silk), either when it is too fresh or when it has been allowered to mature for too long a period, but only when it is in a very definite stage in its spontaneous decomposition. In order to attain this phase, which must be accurately maintained and beyond which the decomposition must not be allowed to proceed, a maturing process occupying several days is necessary. If the viscose is allowed to stand for too long a period it finally decomposes completely with the separation of cellulose hydrate.

Viscose is moreover accompanied by numerous impurities which are coloured and hinder appreciably its manipulation and applications. The carbon disulphide and other sulphur compounds which are liberated during the spontaneous decomposition give it an unpleasant odour and confer upon it properties which from the standpoint of hygiene are little to be desired. A more important drawback is that the by-products contained in the viscose colour and contaminate the precipitating baths, and evolve hydrogen sulphide during the precipitation process, so that an intricate and costly apparatus is necessary to render innocuous the unpleasant smell and highly poisonous properties of this substance.

If the precipitation process is to yield a satisfactory technical result it places great demands on the composition of the precipitating liquid. Dilute acids or salts have been found to be inadequate in this respect. Only mixtures of acids and salts, to which in certain cases an organic substance must also be added, have the desired effect.

The technical products manufactured from viscose, when precipitated in an insoluble form, are dull, owing to the presence of sulphur and are coloured by other impurities. They must therefore be freed from sulphur and as a rule also bleached.

Purified viscose is not in consideration industrially since the purification processes are complicated and expensive and have an undesirable influence upon its properties.

The alkyl derivatives of cellulose which are insoluble in water and soluble in alkalies (see for instance British Specifications Nos. 177,810, 203,346 and 203,347) yield technical products (such as thread, films and the like) whose tensile strength in contact with water and flexibility in a dry state do not satisfy the highest demands.

From the above mentioned disadvantages which accompany the cellulose derivatives soluble in alkalies hitherto used, it is apparent that it is desirable to substitute for them new cellulose compounds which do not suffer from these faults.

According to the present invention, an oxy-alkyl- or a hydroxy-alkyl derivative of cellulose insoluble in water but soluble in aqueous alkalies (that is to say, a compound in which at least one hydroxyl hydrogen atom of the cellulose is replaced by an oxy-alkyl or a hydroxy-alkyl group), is used, either by itself or mixed with other substances suitable for the purpose, as the basis of the artificial materials for the manufacture of which the known cellulose derivatives soluble in alkali, particularly viscose, have hitherto been used.

The oxy-alkyl and hydroxy-alkyl derivatives of cellulose which may readily be obtained for example by the reaction between cellulose and a halo-hydrin, particularly a mono-halohydrin of a poly-alcohol, in the presence of an alkali (see for example copending application Ser. No. 16,258, filed March 17, 1925), possess the following properties which render them particularly suitable for the purpose in question. (The expression "oxy-alkyl derivative of cellulose" in the specification and claims includes the oxy-alkyl and hydroxy-alkyl derivatives of cellulose and conversion products thereof).

1. They are resistant and indifferent; for instance they do not change appreciably on boiling for several hours with strong lye (for instance a solution of caustic soda of 20 per cent strength).

2. They are stable both in the dissolved and in the solid state.

3. They are colourless as also are their solutions.

4. They contain no by-products of the reaction, which render difficult their working up into artificial materials, even in the crude reaction mixture obtained in their preparation.

5. They are of a high degree of purity when isolated from the mixture.

6. They are easily precipitated in the form of technical articles. Solutions of the oxy-alkyl and hydroxy-alkyl derivatives of cellulose brought into the desired form solidify even on treatment with a dilute inorganic or organic acid (even tannic acid), or with a solution of a salt, or merely with an alcohol, as well as with formaldehyde solution to yield products which possess the solidity necessary for the subsequent operations such as washing and the like.

7. They are readily soluble in dilute solutions of alkalies.

8. They have colloidal properties of a high degree, their solutions are viscous sols.

9. The threads, skins, layers, coatings, and artificial materials in general, obtained from their solutions are colourless, transparent, strong, and also flexible, in the wet or dry state. In this respect they are superior to the alkyl derivatives of cellulose which are insoluble in water but soluble in alkalies.

This circumstance is surprising, because it would be expected that the resistance towards water of the oxy-alkyl and hydroxy-alkyl derivatives of cellulose and of the artificial materials manufactured therefrom, would be less than that of those prepared from the alkyl derivatives soluble in alkalies.

The present invention consists in dissolving in an alkali either alone or mixed with other binding agents, colloids, or softening agents, an oxy-alkyl or a hydroxy-alkyl derivative of cellulose insoluble in water but soluble in alkalies, which is obtained by the reaction between cellulose and a halohydrin, particularly a monohalohydrin of a poly-alcohol, in the presence of an alkali, bringing the solution or paste so obtained into the form of the desired artificial material, if necessary with the addition of a filling material, pigment, dyestuff or softening agent, and treating the formed material, if desired, after previously drying it partially or completely, with an agent which is capable of precipitating the oxy-alkyl or hydroxy-alkyl derivative of cellulose. As precipitating agents there may be used not only the substances or mixtures of substances known in the viscose and ammoniacal-copper-oxide-cellulose industries, but also many other substances which have been found inadequate for the conversion of viscose into technical products.

The precipitating agent may be used either cold, warm, or hot, in the form of a bath or of a mist or spray. The washing and drying processes which follow the precipitation are conducted in the known manner.

As colloids and softening agents suitable for addition to the oxy-alkyl or hydroxy-alkyl derivatives of cellulose the following may be mentioned by way of example:

Hydrated cellulose or hydrocellulose soluble in alkalies, viscose (cellulose xanthate) either crude, or purified by any known process, albuminous substances, proteins, glue (gelatine), amyloid, starch and starch-like substances, dextrin, gums (gum arabic, tragacanth, beet-gum or the like), also pectin substances, tragasol, resins soluble in alkalies, resinous condensation products soluble in alkalies, obtained by condensation of a phenol, or an aromatic amine, or a urea with an aldehyde, shellac, glycerine, di-glycerine, poly-glycerine, glycols, sugars and syrups, soaps, fats, ammonium or alkali-metal derivatives of fatty sulphonic acids, such as turkey-red oil, and the like.

On account of their colloidal nature, the oxy-alkyl or hydroxy-alkyl derivatives of cellulose may be mixed with other colloids or softening agents insoluble in water to produce emulsions or suspensions which do not separate at all, or do not separate readily. Their solutions or pastes may therefore be mixed with agents such as india rubber, gutta percha, balata, fats, drying or non-drying oils, metallic salts of fatty acids, and the like.

The oxy-alkyl or hydroxy-alkyl derivatives of cellulose are particularly suitable for the manufacture of the following artificial substances; artificial threads, particularly artificial silk; films; coatings and layers of every kind; dressings insoluble in water for textiles, paper, leather and the like; sizing for yarns; book cloth; artificial leather; adhesives and cements; plates and plastic compositions in general; and the like. They may also be used as thickening agents or fixing agents for pigments in textile printing.

The expression "artificial material" used in the specification and claims includes all the artificial materials mentioned in the preceding paragraph. The term "artificial material" is used in the further sense that it is intended to exclude the oxy-alkyl and hydroxy-alkyl derivatives of cellulose as chemical compounds as such, but is intended to include matter or bodies made of or including such compounds as distinguished from the mere chemical compounds.

The expression "oxy-alkyl derivative of cellulose" used in the specification and claims includes those derivatives of cellulose in which at least one hydroxyl hydrogen atom of cellulose, a cellulose hydrate, a hydrocellulose, or an oxy-cellulose is replaced by an oxy-alkyl or a hydroxy-alkyl group, and which may be obtained by acting on cellulose or on a conversion product thereof with a halohydrin, particularly a mono-halohydrin of a poly-alcohol, in the presence of an alkali.

The following examples illustrate the invention, the parts being by weight:

I. Films.

1. 100 parts of a 1:2-dihydroxy-propyl-cellulose insoluble in water but soluble in dilute alkalies (obtained by acting on cellulose with α-monochlorhydrin in the presence of an alkali) or hydroxy-ethyl-cellulose (obtained by acting on cellulose with ethylene-chlorhydrin in the presence of an alkali) are dissolved in 900 to 1200 parts of a solution of caustic soda of 5 to 8 per cent strength, whilst stirring, kneading, or the like. This solution, after filtering if necessary, is distributed in the shape of a layer by means of a suitable hopper and coagulated by a solution of sulphuric acid of 10 per cent strength, of acetic acid of 25 per cent strength, ammonium chloride solution of 30 per cent strength, of a tannin solution of 20 per cent strength, or of a formaldehyde solution of 40 per cent strength, or by any other precipitating bath known in the manufacture of viscose, for example one composed of sulphuric acid, a salt and an organic substance such as sugar. The solidified film is thoroughly washed with water and dried. The endless film may be treated before or after drying with an aqueous solution of glycerine (for instance, of 10 per cent strength), in order to increase its flexibility.

II. Artificial thread, particularly artificial silk and artificial hair.

2. A solution, prepared as in Example 1, of a 1:2-dihydroxy-propyl-cellulose (obtained by acting on cellulose with α-monochlorhydrin in the presence of an alkali), or of a hydroxy-ethyl-cellulose (obtained by acting on cellulose with ethylene-chlorhydrin in the presence of an alkali) is forced or allowed to flow through a fine orifice into a precipitating bath as referred to in Example 1 and the solidified thread which forms is thoroughly washed with water and dried. The artificial thread may be treated either in the course of its manufacture or when completed with a hardening agent such as formaldehyde or the like.

3. A mixture of 50 parts of viscose (prepared in the usual manner and containing 8 to 12 per cent by weight of cellulose), and 50 parts of a solution of a 1:2-dihydroxyl-propyl-cellulose (obtained by acting on cellulose with α-monochlorhydrin in the presence of an alkali), or of a hydroxy-ethyl-cellulose (obtained by acting on cellulose with ethylene-chlorhydrin in the presence of an alkali) prepared as in Example 1 is spun into artificial thread as described in Example 2.

III. Dressing for textile materials.

4. A woven fabric, such as a cotton fabric, is provided by means of a suitable machine, such as a padding machine or a spreading machine, with one or more coatings of a solution, prepared as in Example 1, of a 1:2-dihydroxy-propyl-cellulose (obtained by acting on cellulose with α-monochlorhydrin in the presence of an alkali) or of a hydroxy-ethyl-cellulose (obtained by acting on cellulose with ethylene-chlorhydrin in the presence of an alkali), and is then dried. (When more than one coating is applied it is desirable to dry the material after the application of each coating.) After the material has been dried and and if desired steamed for a short time, it is introduced into a precipitating bath as referred to in Example 1, and is then washed and dried. The textile material may be treated before or after drying with a softening agent, such as a soap solution, an aqueous solution of turkey-red oil, or an aqueous solution of glycerine.

5. The procedure is as in Example 4, with the exception that there is added to the solution a filling material, for instance zinc-white, china-clay, or talc.

6. The procedure is as in Example 4 or 5, with the exception that there is added to the solution a softening agent, such as a drying or non-drying oil, or a soap.

7. The procedure is as in Example 4, 5 or 6, with the exception that the solution is mixed with a solution of starch.

After it is finished, the dressed or coated textile material may be smoothed, polished or calendered, or provided with a pattern, or glazed by treatment with riffled or engraved rollers.

IV. Printing on textiles.

8. 100 parts of a solution of 1:2-dihydroxy-propyl-cellulose (obtained by acting on cellulose with α-monochlorhydrin in the presence of an alkali) or of a hydroxy-ethyl-cellulose (obtained by acting on cellulose with ethylene-chlorhydrin in the presence of an alkali) are mixed with 6 to 10 parts of finely ground mica, or with 4 parts of lamp black, or with 8 to 10 parts of zinc-white and printed by means of suitable printing rollers on cotton fabric, if necessary after previously grinding in a colour-grinding mill. The printed and dried fabric is then treated in a precipitating bath as referred to in Example 1, optionally after previously steaming, and is then washed and dried.

V. Book cloth.

9. A conveniently porous textile material, such as calico, is provided with one or more coatings of a solution, prepared as in Example 1, of 1:2-dihydroxy-propyl-cellulose (obtained by acting on cellulose with α-monochlorhydrin in the presence of an alkali) or of a hydroxy-ethyl-cellulose (obtained by acting on cellulose with ethylene-chlorhydrin in the presence of an alkali) until the pores of the fabric are completely filled. If more than one coating is applied, the material is dried after each coating. The material may be calendered hot or cold, and after each coating or only after the final coating. The coated, filled fabric is then passed through a precipitating bath as referred to in Example 1, and is then washed and dried.

10. The procedure is as in Example 9, with the exception that there is added to the solution some zinc-white, china-clay, finely divided cellulose fibres, soot, a lake, mica, a dyestuff resistant towards alkalies, or the like.

11. The procedure is as in Example 9 or 10, with the exception that there is added to the solution about 10 per cent by weight of castor oil (calculated on the weight of the cellulose derivative).

The finished book cloth may be provided with any desired pattern or grain by pressing between plates or by embossing it by means of engraved rollers, or the like, or it may be glazed by calendering.

I claim:

1. A process for the manufacture of artificial materials, which comprises bringing a solution in an alkali of an oxy-alkyl-derivative of cellulose soluble in aqueous alkalies but insoluble in water into the form of an artificial material and treating the solution so as to produce separation of solid therefrom.

2. A process for the manufacture of artificial materials, which comprises bringing a solution in an alkali of an oxy-alkyl-derivative of cellulose soluble in aqueous alkalies but insoluble in water into the form of an artificial material and treating it with a suitable precipitating agent.

3. A process for the manufacture of artificial materials, which comprises bringing a solution in an alkali of a hydroxy-ethyl-cellulose soluble in aqueous alkalies but insoluble in water into the form of an artificial material and treating the solution so as to produce separation of solid therefrom.

4. A process for the manufacture of artificial materials, which comprises bringing a solution in an alkali of a hydroxy-ethyl-cellulose soluble in aqueous alkalies but insoluble in water into the form of an artificial material and treating it with a suitable precipitating agent.

5. A process for the manufacture of artificial materials, which comprises bringing a solution in an alkali of an oxy-alkyl derivative of cellulose soluble in aqueous alkalies but insoluble in water into the form of an artificial material and then treating it with an acid.

6. A process for the manufacture of artificial materials, which comprises bringing a solution of an oxy-alkyl derivative of cellulose soluble in aqueous alkalies but insoluble in water into the form of an artificial material and then treating it with a solution of salt.

7. A process for the manufacture of artificial materials, which comprises bringing a solution in an alkali of an oxy-alkyl derivative of cellulose soluble in aqueous alkalies but insoluble in water into the form of an artificial material, drying it and then treating it with a suitable precipitating agent.

8. A process for the manufacture of artificial materials, which comprises bringing a solution in an alkali of an oxy-alkyl derivative of cellulose soluble in aqueous alkalies but insoluble in water and at least one other colloid into the form of an artificial material and treating it with a suitable precipitating agent.

9. A process for the manufacture of artificial materials, which comprises bringing an alkaline solution which contains at least one oxy-alkyl derivative of cellulose soluble in aqueous alkalies but insoluble in water, into the form of an artificial material and treating it with a suitable precipitating agent.

10. As a new product, an artificial material which consists of at least one oxy-alkyl derivative of cellulose which is insoluble in water but soluble in alkalies.

11. As a new product, an artificial material which comprises a hydroxy-ethyl-cellulose which is insoluble in water but soluble in alkalies.

12. As a new product, an artificial material which contains as an essential constituent at least one oxy-alkyl derivative of cellulose which is insoluble in water but soluble in alkalies.

13. As a new product, an artificial material which contains as an essential constituent at least one hydroxy-ethyl-cellulose which is insoluble in water but soluble in alkalies.

14. As a new product, an artificial material which contains an oxy-alkyl derivative of cellulose which is insoluble in water but soluble in alkalies and another colloid.

15. As a new product, an artificial material which contains a hydroxy-ethyl-cellulose which is insoluble in water but soluble in alkalies, and another colloid.

16. As a new product, artificial material comprising a cellulose derivative soluble in aqueous caustic alkalies but insoluble in water, alcohol and ether in which derivative at least one hydroxyl hydrogen atom of the cellulose is replaced by an oxygen containing alkyl group.

In testimony whereof I affix my signature.

LEON LILIENFELD.